(12) United States Patent
Hörold et al.

(10) Patent No.: US 6,639,017 B1
(45) Date of Patent: Oct. 28, 2003

(54) FLAME-RETARDANT UNSATURATED POLYESTER RESINS

(75) Inventors: Sebastian Hörold, Erftstadt (DE); Hans-Peter Schmitz, Brühl (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 08/920,305

(22) Filed: Aug. 28, 1997

(30) Foreign Application Priority Data

Sep. 2, 1996 (DE) .......................... 196 35 489

(51) Int. Cl.[7] .......................... C08F 8/00; C08G 63/68
(52) U.S. Cl. .................. 525/168; 528/287; 528/300; 528/301; 528/302; 528/306; 528/307; 528/308; 528/308.6; 528/398; 525/10; 525/43
(58) Field of Search .................. 528/287, 300, 528/301, 302, 306, 307, 308, 308.6, 398; 525/168, 10, 43

(56) References Cited

U.S. PATENT DOCUMENTS

| | | | |
|---|---|---|---|
| 3,433,854 A | | 3/1969 | Apice |
| 4,172,858 A | * | 10/1979 | Clubley et al. .................. 525/2 |
| 4,208,322 A | * | 6/1980 | Sandler .......................... 525/434 |
| 4,244,893 A | * | 1/1981 | Dursch et al. ............... 558/158 |
| 4,248,976 A | * | 2/1981 | Clubley et al. ................. 252/2 |
| 4,250,124 A | * | 2/1981 | Dursch et al. ................ 522/18 |
| 4,778,831 A | * | 10/1988 | Kemper ........................ 522/18 |
| 4,859,713 A | * | 8/1989 | Blount ........................ 521/106 |
| 5,089,559 A | * | 2/1992 | Blount ........................ 525/107 |
| 5,110,840 A | * | 5/1992 | Blount ......................... 521/85 |

FOREIGN PATENT DOCUMENTS

| | | |
|---|---|---|
| DE | 1287311 | 1/1969 |
| EP | 0547701 A2 | 6/1993 |
| GB | 913861 A | 12/1962 |

OTHER PUBLICATIONS

"Melamindiphosphat als Flammschutzmittel fur ungesattigte Polyesterharze", P. Penczek et al., Kunstoffe 77 (1987)4, pp. 415–417.
European Search Report.

* cited by examiner

*Primary Examiner*—Samuel A. Acquah
(74) *Attorney, Agent, or Firm*—Anthony A. Bisulca

(57) ABSTRACT

The invention relates to flame-retardant, unsaturated polyester resins made from unsaturated and saturated dicarboxylic acids and/or their anhydrides, from polyhydric alcohols, from one or more monomers and from a reactive phosphorus compound, which contain structural units of the formula IV

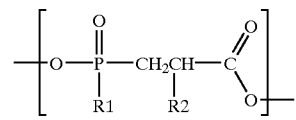

where R1 is straight-chain or branched alkyl, cycloalkyl, aryl or alkylaryl groups having from 1 to 18 carbon atoms and R2 is methyl or hydrogen. The invention likewise relates to a process for preparing such polyester resins and to their use.

21 Claims, No Drawings

FLAME-RETARDANT UNSATURATED POLYESTER RESINS

The invention relates to flame-retardant, unsaturated polyester resins made from unsaturated and saturated dicarboxylic acids and/or their anhydrides, from polyhydric alcohols, from one or more monomers, and from a reactive phosphorus compound, to a process for their preparation and to their use.

Unsaturated polyester resins are polycondensation products made from saturated and unsaturated dicarboxylic acids or their anhydrides with diols. They are cured by free-radical polymerization using initiators (e.g. peroxides) and accelerators. The double bonds of the polyester chain react with the double bond of the copolymerizable solvent monomer. The most important dicarboxylic acids are maleic anhydride, fumaric acid and terephthalic acid. The most frequently used diol is 1,2-propanediol, but ethylene glycol, diethylene glycol and neopentyl glycol, inter alia, are also often used.

The most suitable crosslinking monomer is styrene. Styrene can be mixed freely with the polyester resins and is easily copolymerized. The styrene content in unsaturated polyester resins is normally from 25 to 40%. In free-flowing unsaturated polyester resins, the monomer used is usually diallyl phthalate.

Unsaturated polyester resins are often converted into moldings. Moldings made from glass-fiber-reinforced unsaturated polyester resins are distinguished by their good mechanical properties, low density, resistance to chemicals and excellent surface quality. This and their favorable price have allowed them increasingly to replace metallic materials in applications in rail vehicles, building and aeronautics. Depending on the application sector, there are different requirements with regard to mechanical, electrical and fire protection properties. Especially in the rail vehicles sector, the fire protection requirements have recently been tightened.

It is known that unsaturated polyester resins may be made flame-retardant by using bromine- or chlorine-containing acid components and/or alcohol components, for example hexachloroendomethylenetetrahydrophthalic acid (HET acid), tetrabromophthalic acid or dibromoneopentyl glycol. Antimony trioxide is frequently used as synergist. A disadvantage of bromine- or chlorine-containing polyester resins is that corrosive and possibly environmentally significant gases are produced when a fire occurs and can lead to considerable damage to electronic components, for example to relays in rail vehicles. Under unfavorable conditions, polychlorinated and/or brominated dibenzodioxins and furans may also be produced.

It is also known that unsaturated polyester resins, also in the form of molding compositions, may be provided with fillers such as aluminum hydroxide, which have a quenching action. At filling rates of from 150–200 parts of aluminum hydroxide per 100 parts of unsaturated polyester resin, it is possible to achieve self-extinguishing and a low smoke density. However, such formulations cannot be used for injection processes, since homogeneous distribution of the aluminum hydroxide cannot be achieved with the reinforcing materials used. For injection processes, chlorinated or brominated unsaturated polyester resins are therefore used.

The use of phosphorus compounds in unsaturated polyester resins in order to establish adequate flame retardancy has already been proposed in a number of ways. U.S. Pat. No. 3,433,854 describes the use of phosphoric esters in halogen-containing unsaturated polyester resins. Melamine diphosphate has also been tested as a flame retardant for unsaturated polyester resins (P. Penczek et al., Kunststoffe 77 (1987) 4, pp. 415–417).

A disadvantage of the systems known hitherto is, however, that in some cases large amounts of flame retardant must be introduced meaning that considerable alterations in the mechanical and electrical properties of the polyester resins have to be accepted.

It is therefore an object of the present invention to provide flame-retardant, unsaturated polyester resins which do not have the abovementioned disadvantages and which are halogen-free.

This object is achieved by means of flame-retardant, unsaturated polyester resins of the type described at the outset, which contain structural units of the formula IV

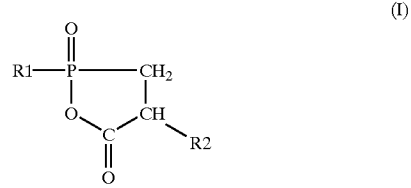

where R1 is straight-chain or branched alkyl, cycloalkyl, aryl or alkylaryl groups having from 1 to 18 carbon atoms and R2 is methyl or hydrogen.

The phosphorus compound is preferably a phosphinic anhydride which contains carboxyl groups and has the formula I, a phosphinic acid which contains carboxyl groups and has the formula II or a phosphinic acid which has an esterified carboxyl group and has the formula III

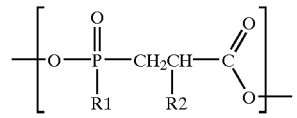           (I)

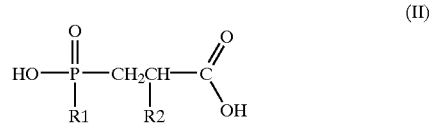           (II)

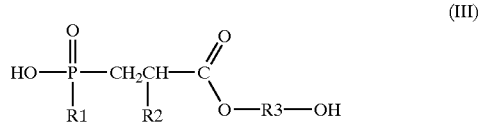           (III)

where R1 is straight-chain or branched alkyl, cycloalkyl, aryl or alkylaryl groups having from 1 to 18 carbon atoms, R2 is methyl or hydrogen and R3 is straight-chain or branched alkylene, cycloalkylene, arylene or alkylarylene groups having from 1 to 18 carbon atoms.

R1 and R3 are preferably straight-chain or branched alkyl, cycloalkyl or aryl groups having from 1 to 6 carbon atoms.

The reactive phosphorus compound is preferably 2-methyl-2,5-dioxo-1-oxa-2-phospholane or its glycol esters.

The unsaturated dicarboxylic acid and/or dicarboxylic anhydride is preferably maleic acid, fumaric acid, itaconic acid, mesaconic acid or citraconic acid.

The unsaturated dicarboxylic anhydride is particularly preferably maleic anhydride.

Other dicarboxylic acids or dicarboxylic anhydrides which may be used are phthalic acid, isophthalic acid, terephthalic acid, adipic acid, azelaic acid or sebacic acid.

The polyhydric alcohol is preferably 1,2-propanediol, 1,2-butanediol, or ethylene glycol, neopentyl glycol, diethylene glycol, dipropylene glycol, ethoxylated or propoxylated bisphenol A and/or tricyclodecanedimethanol.

The polyhydric alcohol is particularly preferably 1,2-propanediol or ethylene glycol.

The monomer is preferably an unsaturated hydrocarbon.

The unsaturated hydrocarbon is preferably styrene, methylstyrene, methyl methacrylate, diallyl phthalate and/or triallyl cyanurate.

The phosphorus content in the flame-retardant, unsaturated polyester resin is preferably from 1 to 10% by weight.

The novel flame-retardant, unsaturated polyester resins preferably contain at least 10% by weight of an $\alpha,\beta$-unsaturated dicarboxylic acid or its anhydrides.

They particularly preferably contain at least 20% by weight of an $\alpha,\beta$-unsaturated dicarboxylic acid or its anhydrides.

This object is also achieved by means of a process for preparing flame-retardant, unsaturated polyester resins from unsaturated and saturated dicarboxylic acids and/or their anhydrides, from polyhydric alcohols, from one or more monomers and from a reactive phosphorus compound, which comprises reacting a phosphorus compound of the formula I, II or III with unsaturated dicarboxylic acids or their anhydrides, saturated dicarboxylic acids or their anhydrides, and polyhydric alcohols, and then mixing with the monomer(s).

The reaction is preferably conducted at temperatures of from 100 to 250° C.

The reaction is preferably carried out in a solvent.

Aliphatic, cycloaliphatic or aromatic hydrocarbons are preferably used as solvent.

Xylene or toluene are preferably used as solvent.

In the novel process, 100 parts by weight of unsaturated polyester resin are preferably mixed with from 0.1 to 100 parts by weight of monomer(s).

The invention also provides the use of the flame-retardant, unsaturated polyester resins according to the invention, or obtained using the process according to the invention, for producing laminates, shaped articles or coatings.

The invention also provides laminates, shaped articles and coatings produced using the flame-retardant, unsaturated polyester resins according to the invention, or obtained using the process according to the invention.

The polyester resin molding compositions which can be prepared according to the invention may be reinforced by glass fabric or glass fibers. They may also be provided with fillers, such as aluminum hydroxide or powdered quartz.

The novel preparation of the flame-retardant, unsaturated polyester resins, which has been described above, is carried out by condensing a phosphorus compound of the formula I or II, or a product of the reaction of phosphorus compounds of the formula I or II with dihydric alcohols to give esters of the formula III

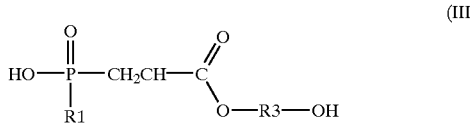

(III)

where R1, R2 and R3 are as defined above, with one or more unsaturated dicarboxylic acids or their anhydrides and one or more diols, to give an unsaturated polyester.

If desired, saturated dicarboxylic acids or dicarboxylic anhydrides may also be included in the condensation. The resin is subsequently mixed with a monomer.

The phosphorus compounds of formulae I and II on which the invention is based may be prepared, for example, by addition of suitable phosphorus compounds to acrylic acid or acrylic esters.

Among the monomers, styrene is particularly preferred for preparing liquid, flame-retardant, unsaturated polyester resins; diallyl phthalate is particularly preferred for preparing free-flowing, flame-retardant, unsaturated polyester resins.

The testing of fire performance was carried out to the Underwriters Laboratories Specification "Test for Flammability of Plastics Materials—UL 94" in the issue dated May 2 1975, on test specimens of 127 mm length, 12.7 mm width and various thicknesses.

The invention is illustrated below by means of examples.
The following compounds were used in the examples:

2-Methyl-2,5-dioxo-1-oxa-2-phospholane (Hoechst AG, Frankfurt/Main, Germany)

Phosphorus-containing acid anhydride having a phosphorus content of 23%; intermediate for organophosphorus syntheses.

Cobalt accelerator NL 49P (Akzo Chemie GmbH, Düren, Germany)

Cobalt octoate solution in dibutyl phthalate having a cobalt content of 1% by weight.

Butanox M 50 (Akzo Chemie GmbH, Düren, Germany)

Methyl ethyl ketone peroxide phlegmatized with dimethyl phthalate; clear liquid having an active oxygen content of at least 9% by weight.

Preparation of the Phosphorus-modified, Unsaturated Polyester Resins

EXAMPLE 1

107 g of maleic anhydride, 147 g of 2-methyl-2,5-dioxo-1-oxa-2-phospholane, 184 g of 1,2-propanediol, 100 g of xylene and 0.1 g of hydroquinone are heated with stirring and introduction of nitrogen to 100° C. in a 500 ml five-necked flask equipped with stirrer, water separator, thermometer and nitrogen supply. The temperature rises to about 150° C. as a result of exothermic reaction. After the exothermic reaction has ceased, stirring is continued for 5 h at 180° C. 43 ml of water and 394 g of polyester are obtained in total.

The phosphorus content of the polyester is 8.6% by weight and the acid number is 35 mg KOH/g.

The hot polyester melt is diluted with 212 g of styrene to give a 35 percent by weight solution of the polyester in styrene.

EXAMPLE 2

107 g of maleic anhydride, 81 g of phthalic anhydride, 74 g of 2-methyl-2,5-dioxo-1-oxa-2-phospholane, 184 g of 1,2-propanediol, 100 g of xylene and 0.1 g of hydroquinone are heated with stirring and introduction of nitrogen to 160° C. in a 500 ml five-necked flask equipped with stirrer, water separator, thermometer and nitrogen supply. The temperature rises to about 160° C. as a result of exothermic reaction. After the exothermic reaction has ceased, stirring is continued for 5 h at 180° C. 44 ml of water and 402 g of polyester are obtained in total.

The phosphorus content of the polyester is 4.2% by weight and the acid number is 27 mg KOH/g.

The hot polyester melt is diluted with 217 g of styrene to give a 35 percent by weight solution of the polyester in styrene.

Fire Test

EXAMPLE 3

100 g of phosphorus-modified, unsaturated polyester resin as in Example 1 is mixed with 0.5 g of cobalt accelerator NL 49P and 2 g of Butanox M 50.

A layer of continuous-strand glass-fiber mat having a weight per unit area of 450 g/m² on a ®Hostaphan release film and a steel frame is laid into a heated press. The unsaturated polyester resin is then distributed uniformly and the laminate is covered with a release film and a pressed sheet of 2 mm thickness is produced at a temperature of 50° C. over the course of one hour at a pressure of 10 bar.

The test specimen achieves a V-0 classification (afterflame time<1 s) in the UL 94 vertical test.

What is claimed is:

1. A flame-retardant, unsaturated polyester resin made from unsaturated and saturated dicarboxylic acids and/or their anhydrides, from polyhydric alcohols, from one or more monomers and from a reactive phosphorus compound, which contains structural units of the formula IV

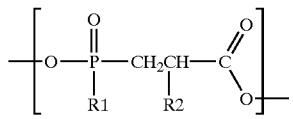

where R1 is straight-chain or branched alkyl, cycloalkyl, aryl or alkylaryl groups having from 1 to 18 carbon atoms and R2 is methyl or hydrogen.

2. A flame-retardant, unsaturated polyester resin as claimed in claim 1, wherein the reactive phosphorus compound is a phosphinic anhydride which contains carboxyl groups and has the formula I, a phosphinic acid which contains carboxyl groups and has the formula II or a phosphinic acid which has an esterified carboxyl group and has the formula III

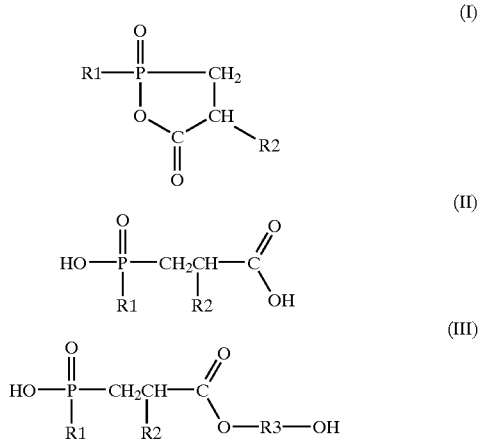

where R1 is straight-chain or branched alkyl, cycloalkyl, aryl or alkylaryl groups having from 1 to 18 carbon atoms, R2 is methyl or hydrogen and R3 is straight-chain or branched alkylene, cycloalkylene, arylene or alkylarylene groups having from 1 to 18 carbon atoms.

3. A flame-retardant, unsaturated polyester resin as claimed in claim 2, wherein R1 and R3 are straight-chain or branched alkyl, cycloalkyl or aryl groups having from 1 to 6 carbon atoms.

4. A flame-retardant, unsaturated polyester resin as claimed in claim 2, wherein the reactive phosphorus compound is 2-methyl-2,5-dioxo-1-oxa-2-phospholane or its glycol esters.

5. A flame-retardant, unsaturated polyester resin as claimed in claim 1, wherein the unsaturated dicarboxylic acid and/or dicarboxylic anhydride is maleic acid, fumaric acid, adipic acid, phthalic acid, isophthalic acid, terephthalic acid and/or tetrahydrophthalic acid.

6. A flame-retardant, unsaturated polyester resin as claimed in claim 5, wherein the unsaturated dicarboxylic anhydride is maleic anhydride.

7. A flame-retardant, unsaturated polyester resin as claimed in claim 1, wherein the polyhydric alcohol is 1,2-propanediol, 1,2-butanediol, or ethylene glycol, neopentyl glycol, diethylene glycol, dipropylene glycol, ethoxylated or propoxylated bisphenol A and/or tricyclodecanedimethanol.

8. A flame-retardant, unsaturated polyester resin as claimed in claim 7, wherein the polyhydric alcohol is 1,2-propanediol or ethylene glycol.

9. A flame-retardant, unsaturated polyester resin as claimed in claim 1, wherein the monomer is an unsaturated hydrocarbon.

10. A flame-retardant, unsaturated polyester resin as claimed in claim 9, wherein the unsaturated hydrocarbon is styrene, methylstyrene, methyl methacrylate, diallyl phthalate and/or triallyl cyanurate.

11. A flame-retardant, unsaturated polyester resin as claimed in claim 1, wherein the phosphorus content in the flame-retardant, unsaturated polyester resin is from 1 to 10% by weight.

12. A flame-retardant, unsaturated polyester resin as claimed in claim 1, wherein the polyester resin contains at least 10% by weight of an α,β-unsaturated dicarboxylic acid or its anhydrides.

13. A flame-retardant, unsaturated polyester resin as claimed in claim 1, wherein the polyester resin contains at least 20% by weight of an α,β-unsaturated dicarboxylic acid or its anhydrides.

14. A process for preparing flame-retardant, unsaturated polyester resins from unsaturated and saturated dicarboxylic acids and/or their anhydrides, from polyhydric alcohols, from one or more monomers and from a reactive phosphorus compound, which comprises reacting a phosphorus compound of the formula I, II or III with unsaturated dicarboxylic acids or their anhydrides, saturated dicarboxylic acids and their anhyrides, and polyhydric alcohols, and then mixing with the monomer(s).

15. The process as claimed in claim 14, wherein the reaction is carried out at temperatures of from 100 to 250° C.

16. The process as claimed in claim 14, wherein the reaction is carried out in a solvent.

17. The process as claimed in claim 16, wherein aliphatic, cycloaliphatic or aromatic hydrocarbons are used as solvent.

18. The process as claimed in claim 17, wherein xylene or toluene are used as solvent.

19. The process as claimed in claim 14, wherein 100 parts by weight of unsaturated polyester resin are mixed with from 0.1 to 100 parts by weight of monomer(s).

20. The use of a flame-retardant, unsaturated polyester resin as claimed in claim 1 for producing a laminate, shaped article or coating.

21. A laminate, shaped article or coating produced using a flame-retardant, unsaturated polyester resin as claimed in claim 1.

* * * * *